R. FREYGANG.
APPARATUS FOR SEPARATING FINE GRAINED ADMIXTURES FROM SLIMES.
APPLICATION FILED NOV. 6, 1912.

1,097,855.

Patented May 26, 1914.

Witnesses:

Inventor:
Reinhold Freygang
per
Lawrence Langner
Attorney.

UNITED STATES PATENT OFFICE.

REINHOLD FREYGANG, OF HAMBURG, GERMANY.

APPARATUS FOR SEPARATING FINE-GRAINED ADMIXTURES FROM SLIMES.

1,097,855.  Specification of Letters Patent.  Patented May 26, 1914.

Application filed November 6, 1912. Serial No. 729,746.

*To all whom it may concern:*

Be it known that I, REINHOLD FREYGANG, a subject of the Emperor of Germany, residing at 25 Lessingstrasse, Hamburg, in the Empire of Germany, have invented certain new and useful Improvements in Apparatus for Separating Fine-Grained Admixtures from Slimes, of which the following is a specification.

The invention has for its object an apparatus by means of which fine-grained admixtures such as sand can be removed from mud or slime, for example, from the slime obtained when kaolin is washed. Hitherto the admixtures of sand deposited in what are called settling channels through which the slime flowed slowly. Such channels are, however, very costly and necessitate frequent cleaning. Furthermore this method is tedious and lengthy because the slime must of necessity flow slowly. Then again washing apparatus comprising a pipe opening into the receiving vessel in which pipe a conveyer worm surrounded by a filtering cover rotates is also known. With this apparatus, however, the separation of the admixtures is very incomplete as the filtering cylinder readily becomes choked, and eddies are unavoidable.

The present invention has for its object an apparatus in which a rotating drum sieve is interposed in the charging pipe communicating with the known worm pipe. The sieve is traversed by the slime from the exterior to the interior in a manner known *per se*. By means of this arrangement the particles separated from the slime by means of the close-meshed drum sieve and which are thrown off centrifugally, become deposited, while at the same time avoiding eddying to the greatest possible extent, and are thereafter removed from the apparatus. The drum sieve protrudes from the slime so that in its rotation it is self-cleaning owing to the striking of the particles adhering to the sieve against the surface of the liquid.

An apparatus for separating sand from kaolin slime is illustrated by way of example in the accompanying drawing, in which:—

Figure 1:
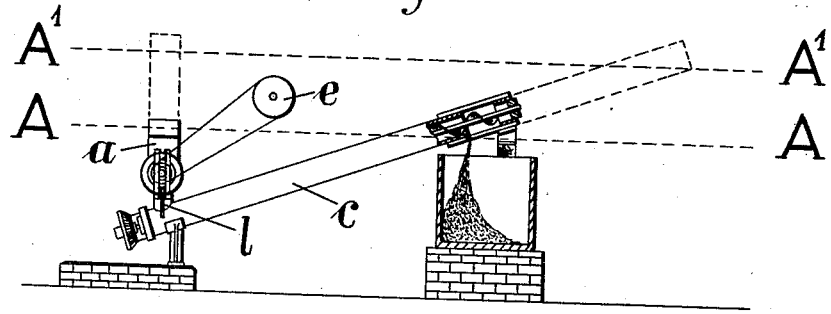
Figure 2:
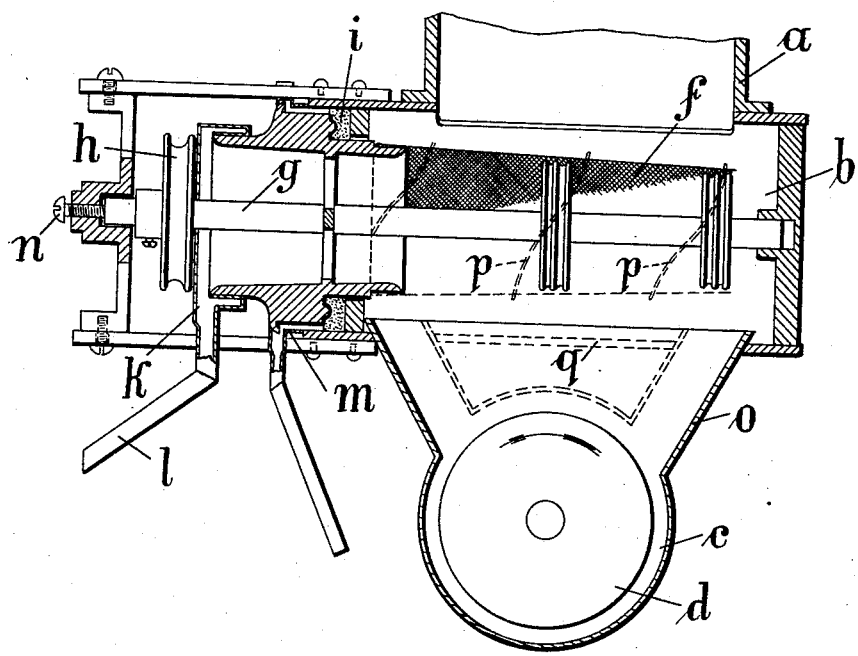

Figure 1 shows the general arrangement. Fig. 2 is a separate view of the sieve drum and its casing in longitudinal section.

In Fig. 1, $a$ is a tube in which the sieve drum mounted in the casing $b$ is inserted. This tube as shown on the drawing is made extensible. A pipe $c$ containing the conveyer worm $d$ connects with this tube $a$ and this tube $c$ is also made extensible and is inclined. The sieve drum is driven from a pulley $e$. The tubes $a$ and $c$ form the two arms of a communicating tube.

The rotating sieve drum $f$ is mounted in the casing $b$, its shaft $g$ being driven by a pulley $h$. The drum is open at one end and forms a joint with the casing $b$ by means of packing $i$. The open end of the drum is surrounded by a catching plate $k$ which merges into a discharge outlet $l$. Another catching plate $m$ is arranged behind the packing $i$ in order to catch the liquid which may escape through the packing. In order to adjust the packing joint the shaft $g$ can be displaced axially by means of a pressure screw $n$. A connecting piece $o$ is fitted to the bottom of the casing $b$ and leads to the worm tube $c$.

The slime is supplied at $a$ and under the pressure of the column of water passes from A—A to the sieve drum and out at the open end of the latter. The sieve around the drum may be a hair sieve with a mesh of from 5000 to 8000 meshes per square centimeter. When the slime passes through the rotating sieve the sand that it contains is retained by the meshes of the sieve, but simultaneously, owing to the rotation of the drum, it is thrown off so that the meshes of the sieve do not become clogged. The sand separated falls through the connection $o$ into the tube $c$ where it is received by the worm $d$ which carries it away. A movement parallel with the axis of the drum can also be imparted to the sand separated. In this case a helicoidal rib $p$ is arranged externally around the sieve and imparts a displacement to the sand toward the right hand side of the connection $o$. Here the sand falls into the worm casing. As the liquid carrying the sand along is also displaced by the helicoidal rib $p$ a flow is produced in the tube $o$ and also in the worm casing, which flow moves to the right downward and to the left upward, this action being assisted by the worm which rotates in the direction indicated by the arrow. If it be desired to separate the upward and downward flows the connecting piece $o$ should be formed as two tubes, the periphery of the casing $b$ remaining at $g$.

In the example described above it has been assumed that the axis of the sieve drum is at right angles to the axis of the worm tube. The sieve drum can, however, be arranged differently, for example in such a manner that its axis is parallel with that of the tube c.

The pressure under which the slime must traverse the drum varies according to the properties of the slime to be treated. Consequently for some materials the water level A—A must be higher than for others. If the water level should be at A'—A', as shown in Fig. 1 for example, the tubes a and c are correspondingly lengthened as shown in broken lines.

In the case of specially fine slimy substances the particles are so small or so adhesive that centrifugal force and the resistance of the water in the rotation of the drum are no longer sufficient to detach them from the sieve. In such cases it is advantageous to make the water level so low that a portion of the drum protrudes above it so that at each rotation the particles leave and return to the water. On returning to the water they strike its surface and also immediately experience the effects of the upward drive and the buoyancy of the water which is considerably stronger than the resistance of the air through which it was previously flowing. These sudden resistances facilitate the detachment of the particles very considerably so that with a partially immersed drum very fine or very sticky substances can be satisfactorily dealt with.

What I claim and desire to secure by Letters Patent of the United States is:—

1. In apparatus for separating fine-grained admixtures from slimes, the combination of an extensible charging tube, a rotating drum sieve in said charging tube through which the slime flows from the exterior to the interior thereof, means for carrying off the slimes, an extensible tube communicating with said charging tube, and means in said tube for carrying off the solid particles.

2. In apparatus for separating fine-grained admixtures from slimes, the combination of an extensible charging tube, a rotating drum sieve in said charging tube, means for carrying off the slimes, helicoidal ribs surrounding said drum for imparting to the liquid surrounding the drum an axial displacement, an inclined extensible tube communicating with said charging tube, and means in said tube for carrying off the solid particles.

3. In apparatus for separating fine-grained admixtures from slimes, the combination of an extensible charging tube, a rotating drum sieve in said charging tube, means for carrying off the slimes, an extensible tube communicating with said charging tube, a connecting piece connecting the two aforesaid tubes, said connecting piece being divided into two tubes, one of which conducts the liquid downward from the drum casing to the tube communicating with the charging tube, while the second reconducts it upward from the tube communicating with the charging tube into the drum casing, and means in said tube for carrying off the solid particles.

In testimony whereof I affix my signature in presence of two witnesses.

REINHOLD FREYGANG.

Witnesses:
 Max F. A. Kaempff,
 Ernest H. L. Mummenhoff.

Copies of this patent may be obtained for five cents each, by addressing the "Commissioner of Patents, Washington, D. C."